(12) United States Patent
Pashayan, Jr.

(10) Patent No.: US 6,252,498 B1
(45) Date of Patent: Jun. 26, 2001

(54) TIRE PRESSURE DETECTING SYSTEM FOR A VEHICLE

(76) Inventor: Charles Pashayan, Jr., 748 E. Holland Ave., Fresno, CA (US) 93704-3737

( * ) Notice: Subject to any disclaimer, the term of this patent is extended or adjusted under 35 U.S.C. 154(b) by 0 days.

(21) Appl. No.: 09/259,304

(22) Filed: Mar. 1, 1999

Related U.S. Application Data (60) Provisional application No. 60/076,595, filed on Mar. 3, 1998.

(51) Int. Cl.$^7$ .................................................. B60C 23/00
(52) U.S. Cl. ......................... 340/447; 340/448; 340/539; 340/693.5; 73/146.5; 73/146.8
(58) Field of Search ..................................... 340/442, 445, 340/447, 448, 539, 693.5; 73/146.5, 146.8

(56) References Cited

U.S. PATENT DOCUMENTS

| | | | |
|---|---|---|---|
| 4,686,855 | * | 11/1997 | Smith ..................................... 340/447 |
| 5,040,561 | * | 8/1991 | Achterholt ............................ 340/447 |
| 5,119,066 | * | 6/1992 | Ballyns ................................. 340/447 |
| 5,463,374 | * | 10/1995 | Mendez et al. ....................... 340/442 |
| 5,602,524 | * | 2/1997 | Mock et al. ........................... 340/447 |
| 5,987,980 | * | 11/1999 | Mangafas et al. ................... 73/146.8 |

* cited by examiner

*Primary Examiner*—Daniel J. Wu
(74) *Attorney, Agent, or Firm*—John T. Roberts

(57) ABSTRACT

A pressure detector system for vehicle tires, within each tire, a pressure detector/transducer for sending a signal reflecting a under-inflation condition in the tire, receiving antennas, placed adjacent to each tire, a visual display of the under-inflated tire, each tire valve having an enlarged pedestal, the pressure detector/transducer mounted within pedestal, a main air passage bore communicating with the air chamber and with the reference chamber, an outer valve core and a inner valve core having a sealing valve stem extending the length of the valve core, biased upwardly, the reference chamber having a deformable wall which moves outwardly when the air pressure within the air chamber falls below the air pressure in the reference chamber, the deformable wall having an electrical contact mounted on the exterior side, a rigid wall spaced apart from the deformable wall, having an electrical contact facing the electrical contact on the deformable wall, when the air pressure in the air chamber falls, the two electrical contacts coming into contact, thereby closing a switch of the pressure detector/transducer, a microprocessor activated when the switch of the pressure detector/transducer is closed, the microprocessor sending a brief signal to the transmitter, the display unit having four wire leads, one going to a position on the body of the vehicle adjacent each tire, each wire lead terminating in a receiving antennas, each receiving antennas picking up only a signal generated by the pressure detector/transducer adjacent it, and sending the signal to the display unit.

5 Claims, 10 Drawing Sheets

TIRE PRESSURE DETECTING SYSTEM FOR A VEHICLE

CROSS-REFERENCE TO RELATED APPLICATION

This invention is disclosed in part in my co-pending Provisional Application entitled TIRE PRESSURE DETECTING SYSTEM FOR A VEHICLE, Serial No. 60/076,595, filed on Mar. 3, 1998, the priority of which is claimed for the common subject matter.

BACKGROUND OF THE INVENTION

The public is generally aware that driving with under-inflated tires is undesirable. However the actual pressure within conventional automobile pneumatic tire is not easy for the driver to determine. Visually, under-inflation is not apparent until it is acute. When a puncture has occurred while driving the driver may have no indication until the under-inflation is acute.

The automotive industry has long recognized that driving with under-inflated tires is unsafe, because the automobile becomes increasingly unstable as the under-inflation increases, possibly leading to a serious accident. In addition, driving with under-inflated tires causes increased fuel consumption, with the consequent greater national consumption of, and dependance on, imported oil.

The industry has, over several decades, proposed various designs to alert a driver to any under-inflated tires of the vehicle while driving the vehicle. Illustrative are the disclosures of the following United States patents:

U.S. Pat. No. 5,040,561 discloses a pressure detector for automobile tires having the following features; a post-sealed reference chamber mounted on the base of the tire valve, a pair of seals, one for the tire and the other for the reference chamber, external contacts closing when the tire is under-inflated, a transmitter inside the tire at the foot of the pedestal, the transmitter sending a signal of under-inflation. A receiver is described generally, but is not disclosed.

U.S. Pat. No. 5,065,134 discloses a pressure detector for automobile tires having the following features; the detector mounted on the rim of the wheel, a reference chamber 20 inflated and pre-sealed at installation, a signal generator attached to the frame adjacent to the detector, the generator causing a signal within the circuit of the detector when the tire is rotated, a warning indicator 17 which gives off an alarm signal when a tire has low pressure, the threshold pressure rising as the speed increases by inertial forces on the flexible diaphragm.

U.S. Pat. No. 5,463,374 discloses a pressure detector for automobile tires having the following features; a transmitter circuit closed by an inertial switch when the vehicle reaches a speed of 25 mph, a battery with life equal to the life of the vehicle, a receiver and display tied into a keyless alarm system, a transmitter in sleep mode until queried.

U.S. Pat. No. 5,557,256 discloses a pressure detector for automobile tires having the following features; a detector mounted outside the valve stem of the tire, a post-sealed reference chamber, a permanent magnet moved by the deflectable wall of the reference chamber, a hand-held device to detect the actual pressure of the tire, necessarily when the vehicle is stopped.

The proposals of the prior art have various drawbacks, proven by the fact that these detectors have not been widely adopted despite the decades of research devoted to their adoption. Among the problems are that some detectors are quite complex, some are quite expensive, others require substantial modification of existing automotive components, and some are simply not adapted for retrofitting on existing vehicles.

SUMMARY OF THE INVENTION

A pressure detector system for vehicle tires, within each tire, a pressure detector/transducer for sending a signal reflecting a under-inflation condition in the tire, receiving antennas, placed adjacent to each tire, a visual display of the under-inflated tire, each tire valve having an enlarged pedestal, the pressure detector/transducer mounted within pedestal, a main air passage bore communicating with the air chamber and with the reference chamber, an outer valve core and a inner valve core having a sealing valve stem extending the length of the valve core, biased upwardly, the reference chamber having a deformable wall which moves outwardly when the air pressure within the air chamber falls below the air pressure in the reference chamber, the deformable wall having an electrical contact mounted on the exterior side, a rigid wall spaced apart from the deformable wall, having an electrical contact facing the electrical contact on the deformable wall, when the air pressure in the air chamber falls, the two electrical contacts coming into contact, thereby closing a switch of the pressure detector/transducer, a microprocessor activated when the switch of the pressure detector/transducer is closed, the microprocessor sending a brief signal to the transmitter, the display unit having four wire leads, one going to a position on the body of the vehicle adjacent each tire, each wire lead terminating in a receiving antennas, each receiving antennas picking up only a signal generated by the pressure detector/transducer adjacent it, and sending the signal to the display unit.

BRIEF DESCRIPTION OF THE DRAWINGS

The invention will be better understood and the objects other than those set forth above will become apparent when consideration is given to the following detailed description thereof. Such description makes reference to the annexed drawings wherein.

DESCRIPTION OF THE PREFERRED EMBODIMENTS

Figure 1:
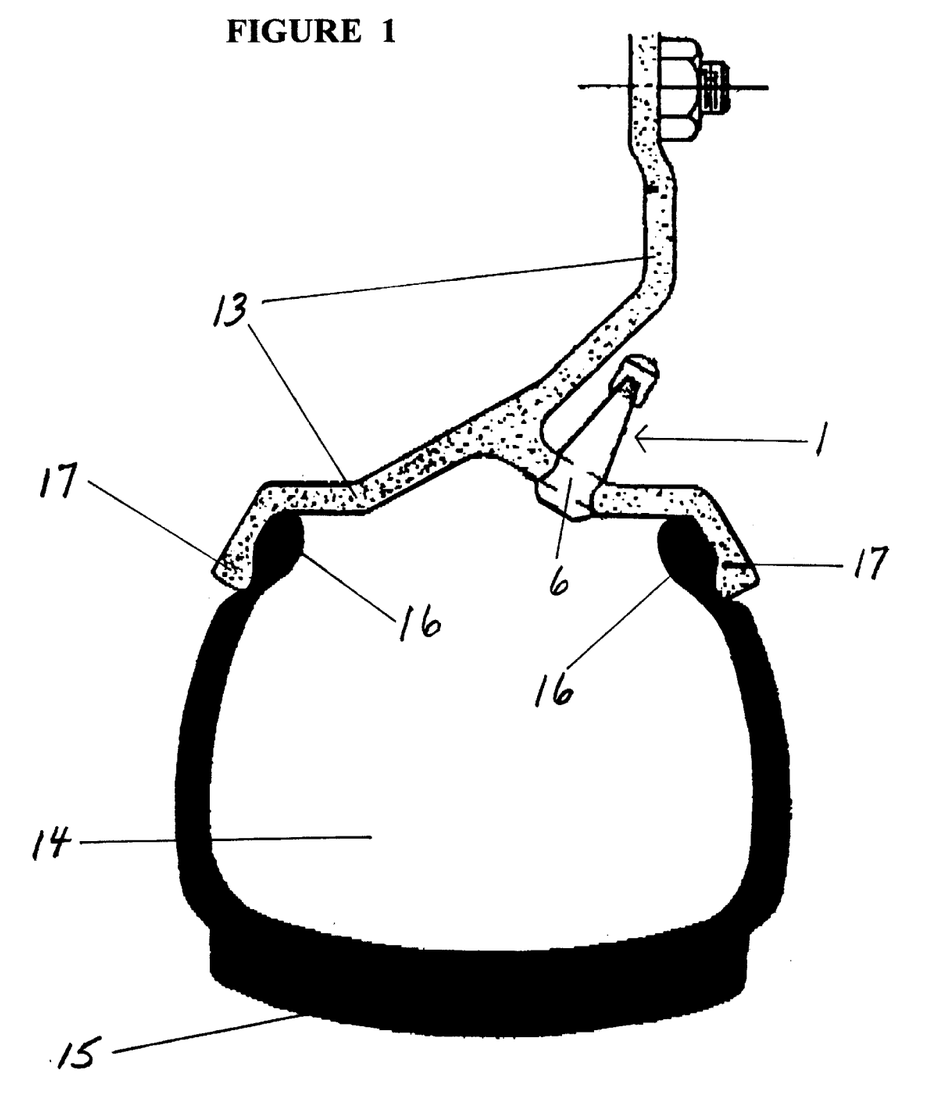
FIG. 1 is a cross sectional view of a prior art tubeless tire 15 mounted on a metal wheel 13.

Shown in FIG. 1 is a conventional metal wheel 13, having a pair of rims 17. A tubeless tire 15 fits within the rims 17 and its beads 16 are held against the rims 17 both by the pressure in air chamber 14, and then by mechanical forces. Passing through an aperture 6 in metal wheel 13 is a tire valve 1.

Figure 2:
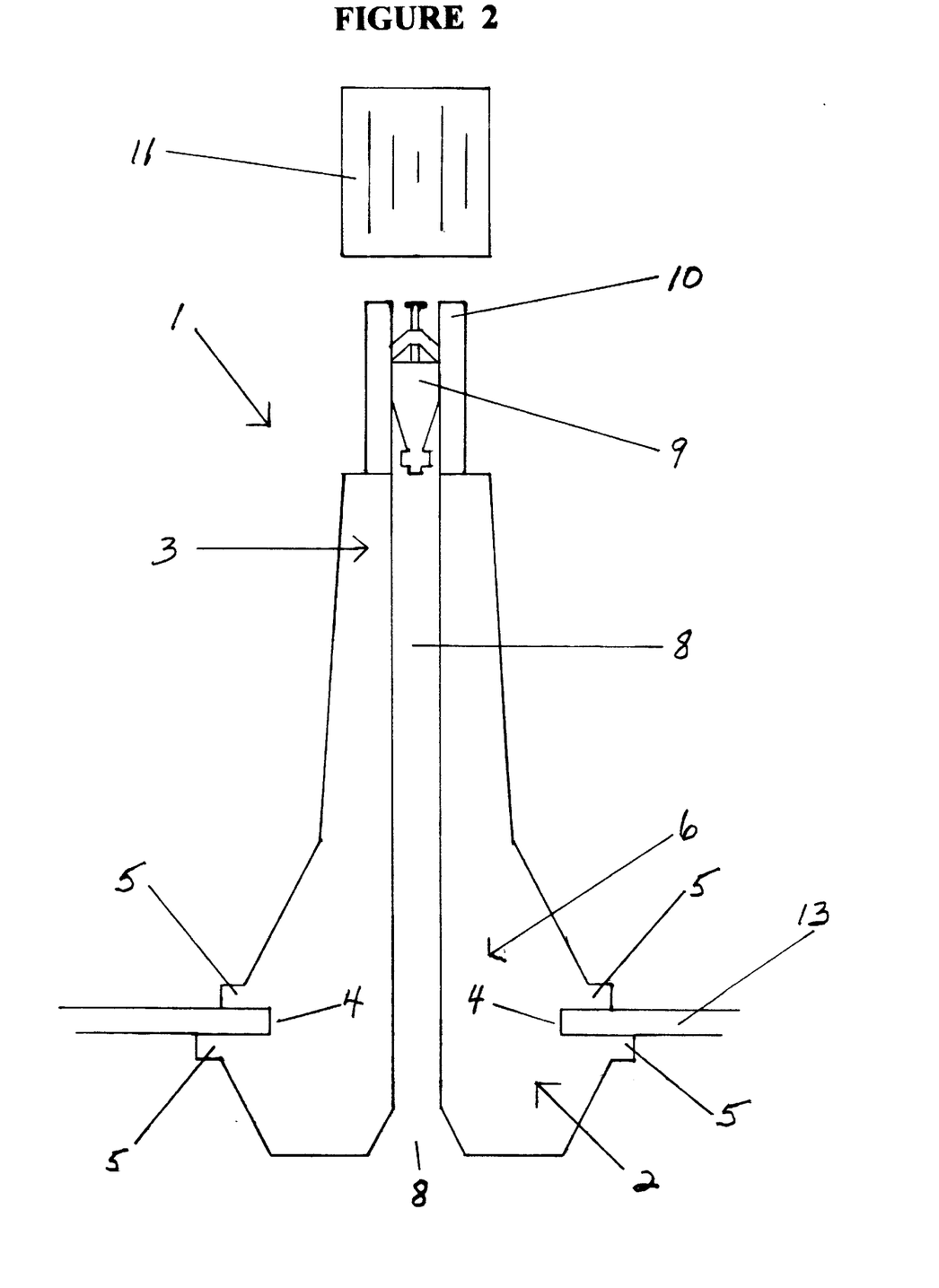
FIG. 2 is a schematic cross sectional view of a prior art tire valve 1.

The conventional tire valve 1 is shown in more detail in FIG. 2. The tire valve 1 has a stem 3 which fits within the chamber formed by the metal wheel 13 and the tubeless tire 15. At the top of the pedestal 2, and separated by a groove 4, are a pair of flanges 5, which fit around the circular aperture 6 in the metal wheel 13. Above the pedestal 2 is the stem 3. Through the pedestal 2 and the stem 3 is a central bore 8, holding at its top a threaded metal sheath 10. The threaded metal sheath 10 is internally threaded to hold a valve core 9, and is externally threaded to hold a dust cap 11.

The tire valve 1 is mounted on the metal wheel 13 by pulling the tire valve 1 through the aperture 6 from the inside, until the flanges 5 are on either side of the aperture 6. The tubeless tire 15 is also mounted on the metal wheel 13. When both are mounted, the tubeless tire 15 is then inflated by putting pressurized air, from an air pump, not shown, through tire valve 1.

Figure 3:
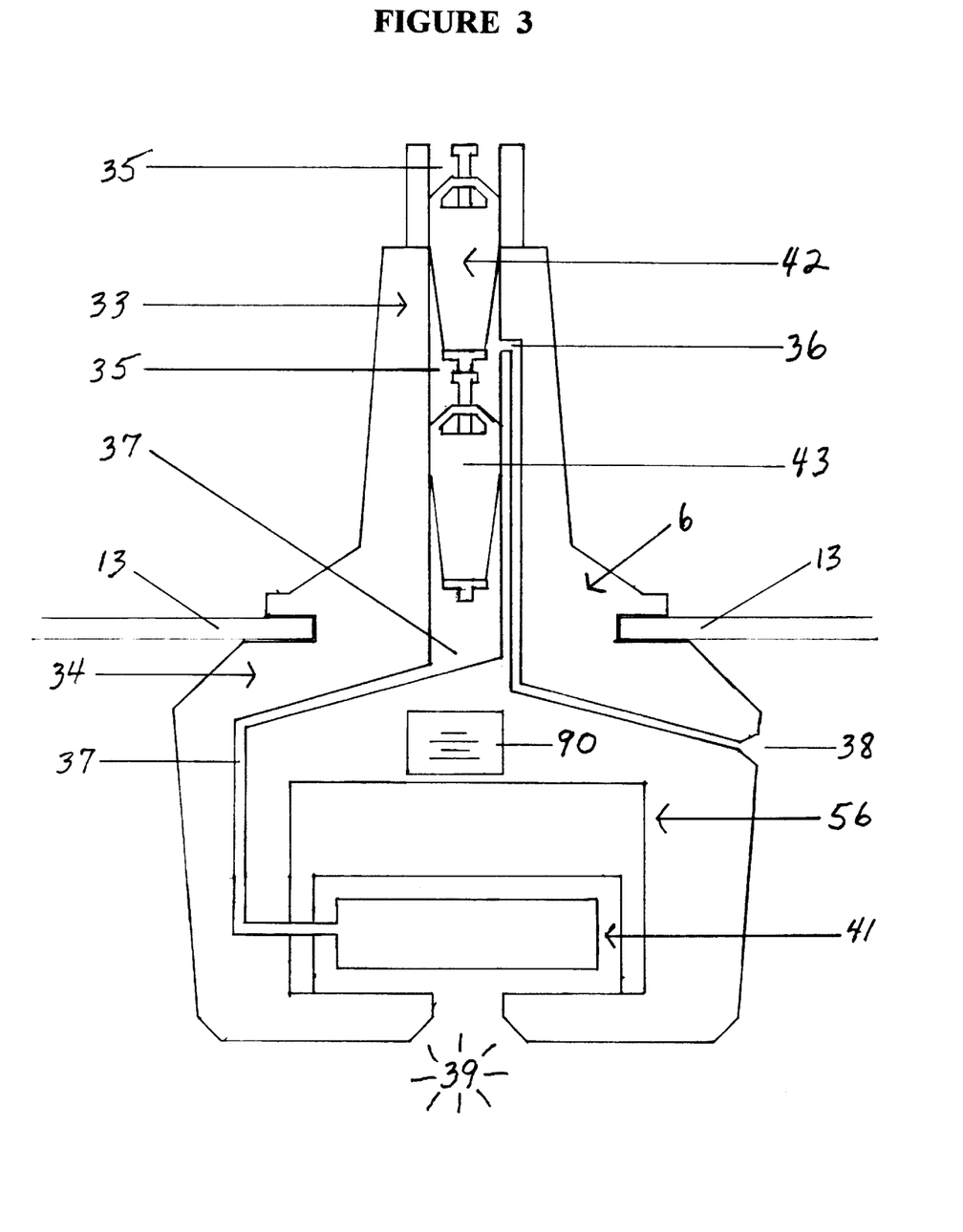
FIG. 3 is a schematic cross sectional view of the pressure detector/transducer 56 of the present invention.

The novel pressure detector of the present invention is shown in FIG. 3. On a conventional metal wheel 13, with a conventional aperture 6 is a modified tire valve. It has an enlarged pedestal 34, containing the pressure detector/transducer 56, the post-sealed reference chamber 41, and the long-life battery 90. The modified stem 33 has a central air passage bore 35, which has two exits, a main air passage bore 36 and a secondary air passage bore 37. The main air passage bore 36 terminates at exit 38 and passes air into air chamber 39. The secondary air passage bore 37 terminates at post-sealed reference chamber 41. The reference chamber 41 also communicates with air chamber 39.

Inside the central air passage bore 35 are the outer valve core 42 which, when it is opened, allows air to enter main air passage bore 36, and when it is closed prevents air from leaving main air passage bore 36. Below the outer valve core 42 is the inner valve core 43 which, when it is opened, allows air to enter reference chamber 41, and when it is closed prevents air from leaving reference chamber 41.

Figure 4:
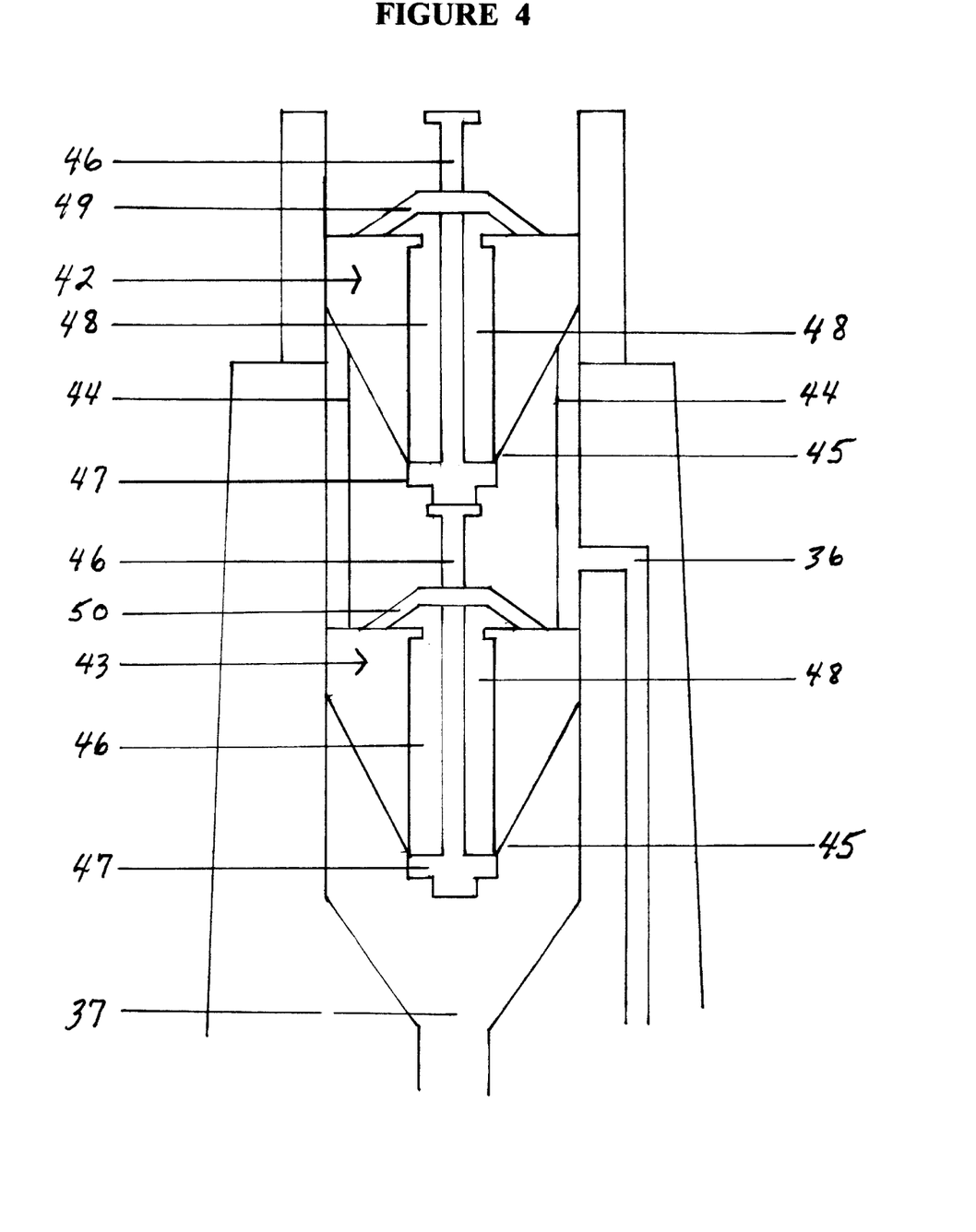
FIG. 4 is a detail view of the outer valve core 42 and of the present invention.
Figure 5:
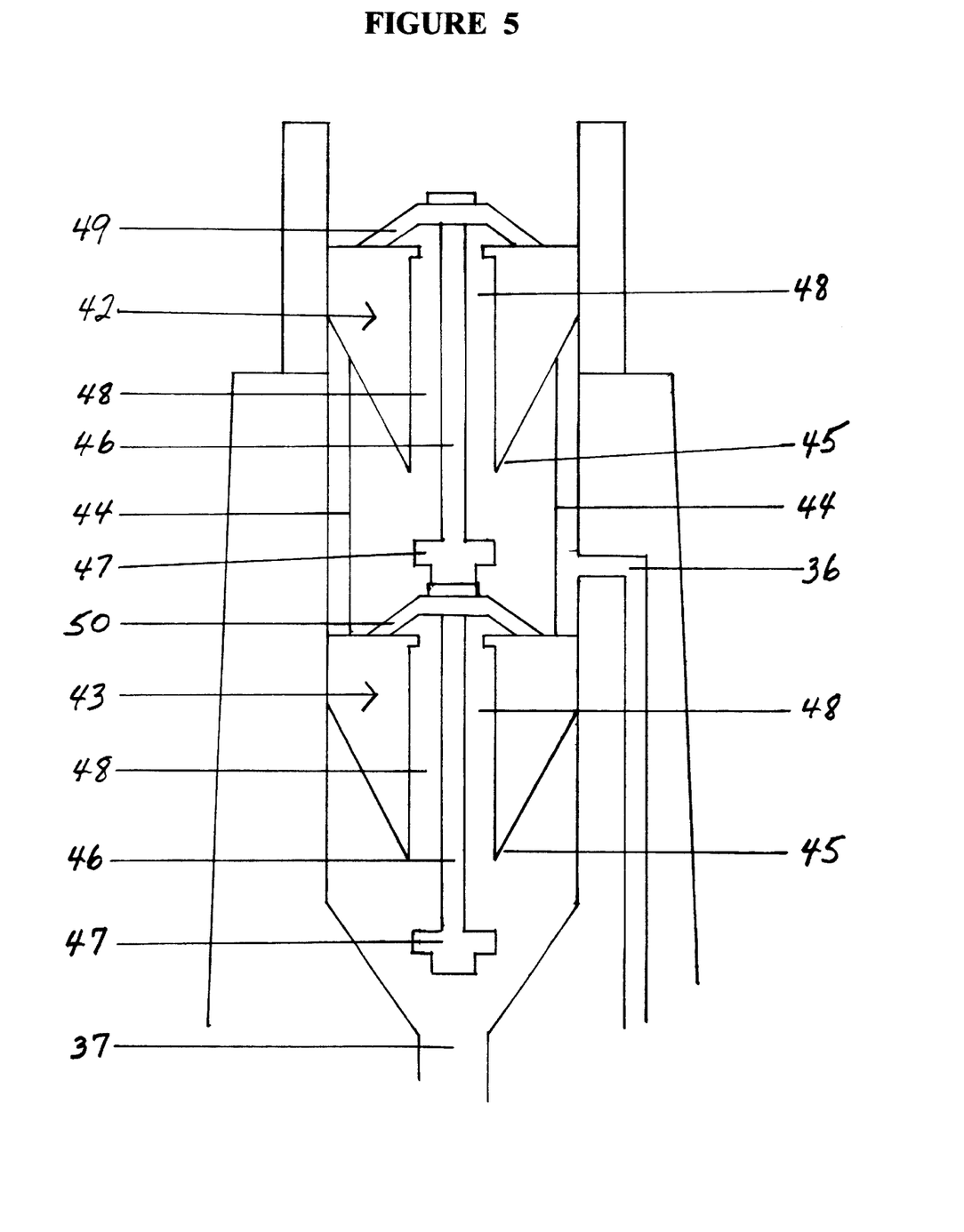
FIG. 5 is another detail view of the outer valve core 42 and of the present invention.

FIG. 4 and FIG. 5 disclose the structure of outer valve core 42 and inner valve core 43, which form an integral unit by struts 44. The outer valve core 42 and the inner valve core 43 each has a central aperture 48. Across the top of outer valve core 42 and inner valve core 43 is an apertured bridge 49. The bottoms of outer valve core 42 and inner valve core 43 each terminate in a rim 50. Through each central aperture 48 pass a sealing valve stem 46 having at its bottom a valve seat 47. Both the sealing valve stem 46 of the outer valve core 42 and of the inner valve core 43 are biased upwardly, so that each valve seat 47 presses against its cooperating rim 50. When so biased, the sealing valve stem 46 of outer valve core 42 prevents the air in the air chamber 39, see FIG. 3, from escaping, thus maintaining the pressure in the tire. When so biased, the sealing valve stem 46 of inner valve core 43 prevents air in the reference chamber 41, see FIG. 3, from escaping, thus maintaining the pressure in the reference chamber 41.

When the sealing valve stem 46 of the outer valve core 42 is depressed by the plunger of an air hose the sealing valve stem 46 performs two functions. It permits air to enter main air passage bore 36 and thus inflates air chamber 39. When sealing valve stem 46 is depressed it also depresses sealing valve stem 46 of inner valve core 43. This permits the sealing valve stem 46 of inner valve core 43 to allow air into the reference chamber 41, thus equalizing at that moment the pressure in air chamber 39 and reference chamber 41. When the air hose is withdrawn, and sealing valve stem 46 of outer valve core 42 is biased upward, that also allows sealing valve stem 46 of inner valve core 43 to be biased upward, closing the passage to reference chamber 41 and sealing the air inside it.

The space between the outer valve core 42 and the inner valve core 43 is critical. If they are to near together, sealing valve stem 46 of inner valve core 43 will not close when sealing valve stem 46 moves upward to press its sealing valve stem 46 against the rim 50 of outer valve core 42. The reference chamber 41 would therefore be constantly at the pressure of the air chamber 39 inside the tire.

If the space between outer valve core 42 and inner valve core 43 is too great, the sealing valve stem 46 of outer valve core 42 will not open sealing valve stem 46 of inner valve core 43. Whether or not the tire is inflated, the reference chamber 41 will remain at ambient air pressure, and thus give false readings.

When the outer valve core 42 and the inner valve core 43 are an integral unit, spaced apart by struts 44, the proper spacing of outer valve core 42 and inner valve core 43 will be ensured, thus ensuring the novel pressure detector functions as designed over its lifetime. The struts 44 do not block the air passage to the main air passage bore 36. The integral unit may be removed, to deflate the tire and remove it, and may be reinstalled, and the setting of the integral unit will be no more critical than is the setting of the prior art tire valve 1.

Figure 6:
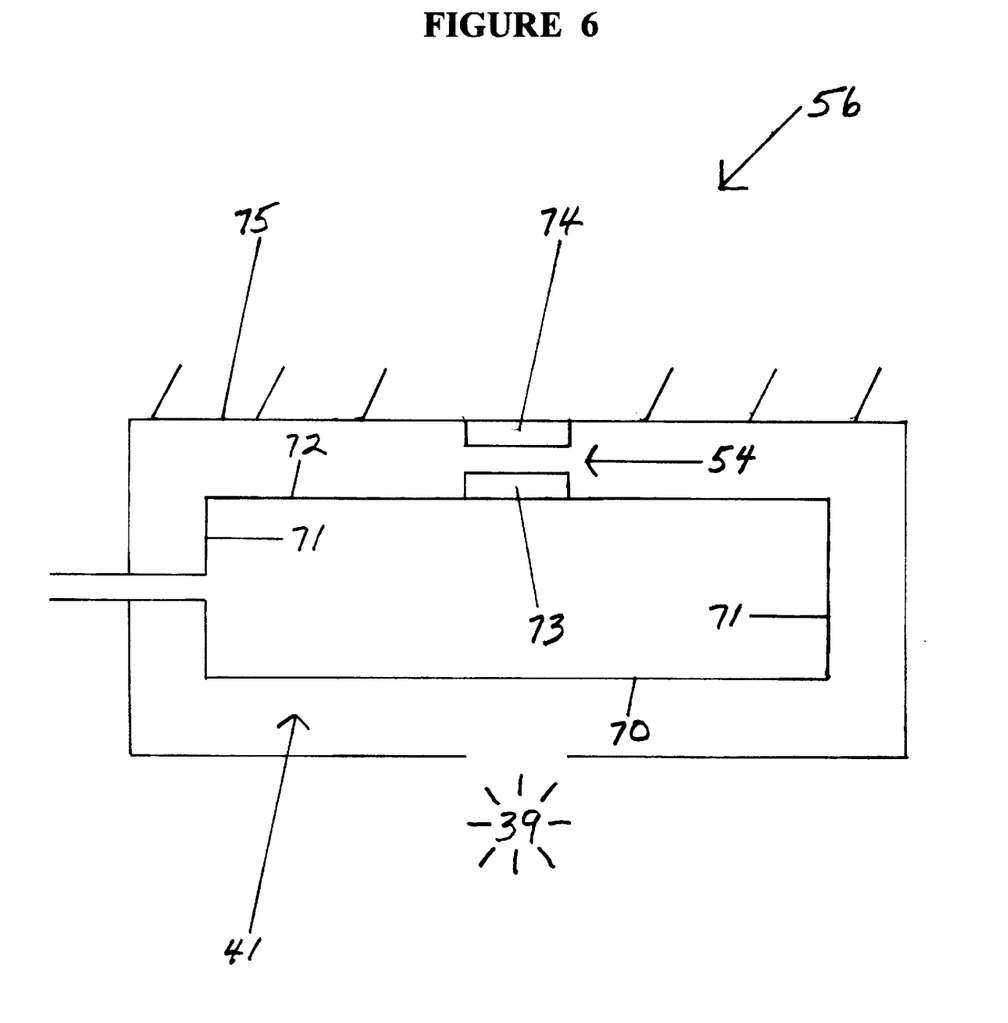
FIG. 6 is a detail view of the pressure detector/transducer 56 and of the present invention.

The pressure detector/transducer 56 is shown in greater detail in FIG. 6. The post-sealed reference chamber 41 has a rigid bottom wall 70, two rigid side walls 71 and a deformable wall 72. Outside the deformable wall 72 is electrical contact 73, and opposite electrical contact 73 is electrical contact 74, mounted on rigid wall 75 of the enlarged pedestal 34.

When the tubeless tire 15 is at its design pressure, e.g. 30 p.s.i., the pressure within the reference chamber 41 will also be at 30 p.s.i. and the deformable wall 72 will therefore not flex. Therefore electrical contact 73 and electrical contact 74 will remain separated and the electrical circuit will remain open, isolating the long-life battery 90. When the automobile is driven at sustained high speeds the temperature within the tubeless tire 15 will rise, by a well known amount, thus increasing the air pressure within tubeless tire 15. This increased temperature will also be transmitted to the air inside reference chamber 41, so the air pressure inside reference chamber 41 will continue to match the air pressure of air chamber 39.

When the tubeless tire 15 develops a leak and the air pressure falls below a selected amount, the threshold pressure differential, then the deformable wall 72 moves outwardly so that secondary air passage bore 37 touches electrical contact 74, closing that portion of the electrical circuit.

Figure 7:
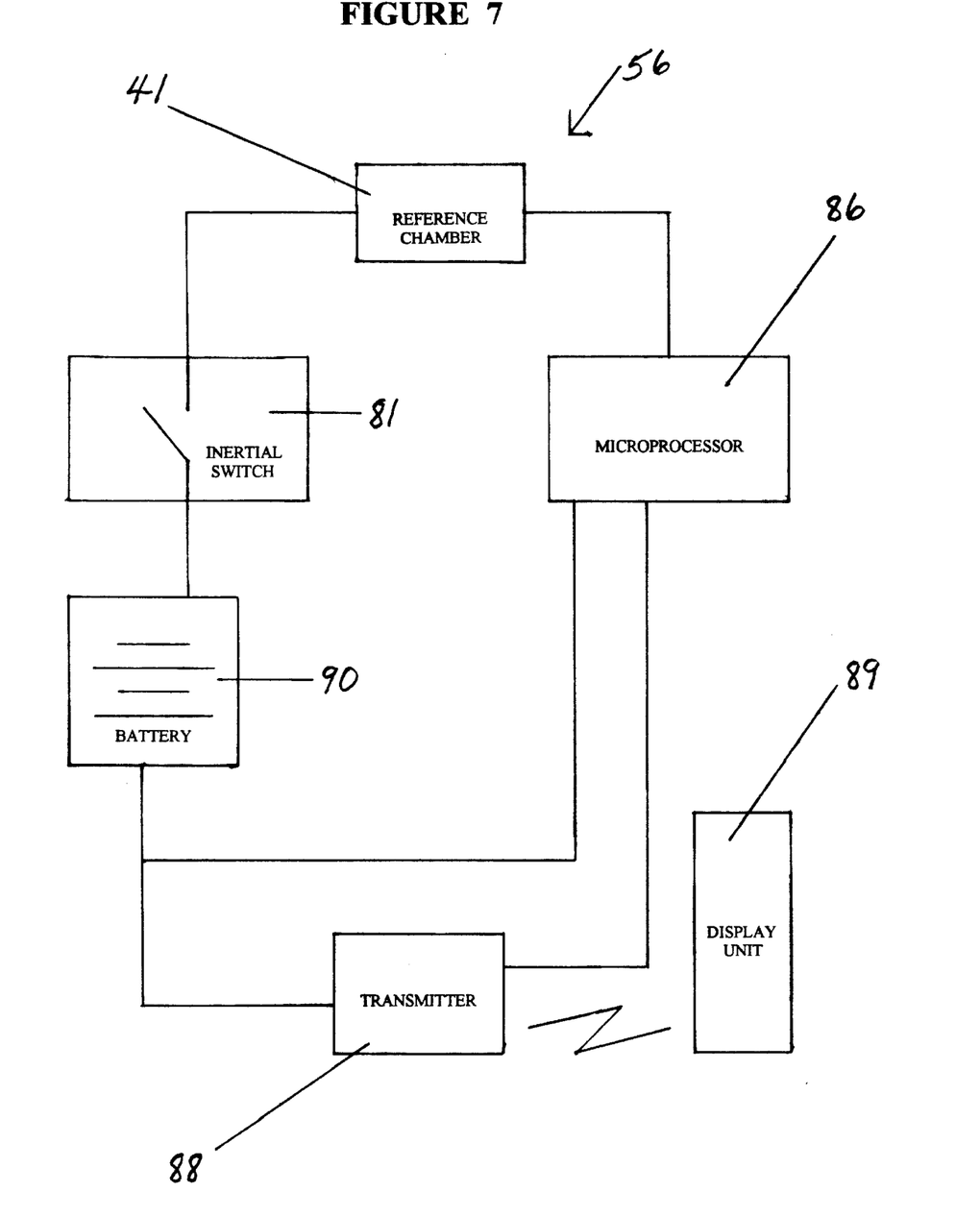
FIG. 7 is a block diagram of the present invention.

The electrical circuit within the enlarged pedestal 34 is more fully shown in FIG. 7. The long-life battery 90 is connected to an inertial switch 81, which is connected to the pressure detector/transducer 56, which is connected to the microprocessor 86, which is connected to both the transmitter 88 and the long-life battery 90.

The function of the inertial switch 81 is to isolate the long-life battery 90 during shelf life and over the time the vehicle is parked, which is normally 90–95% of the time. This will ensure that the long-life battery 90 retains its charge over the 2–3 year life of the tire. The structure of an inertial switch 81 is well known, since it operates on the principle of the flywheel, and closes the switch when the vehicle has achieved a selected speed, e.g. 15 m.p.h. When an under-inflation condition is detected over the selected speed, the electrical signal awakens the microprocessor 86, which sends a signal to transmitter 88, which is relayed to display unit 89, alerting the driver to the under-inflation condition. Once the display unit 89 is alerted it continues its alert for the selected time, allowing the microprocessor 86 to open the circuit to the transmitter 88, thus further protecting the long-life battery 90. If the driver does not stop the vehicle within the selected time, the microprocessor 86 again sends a signal to the transmitter 88, which again alerts the display unit 89 of the under-inflation condition.

Figure 8:
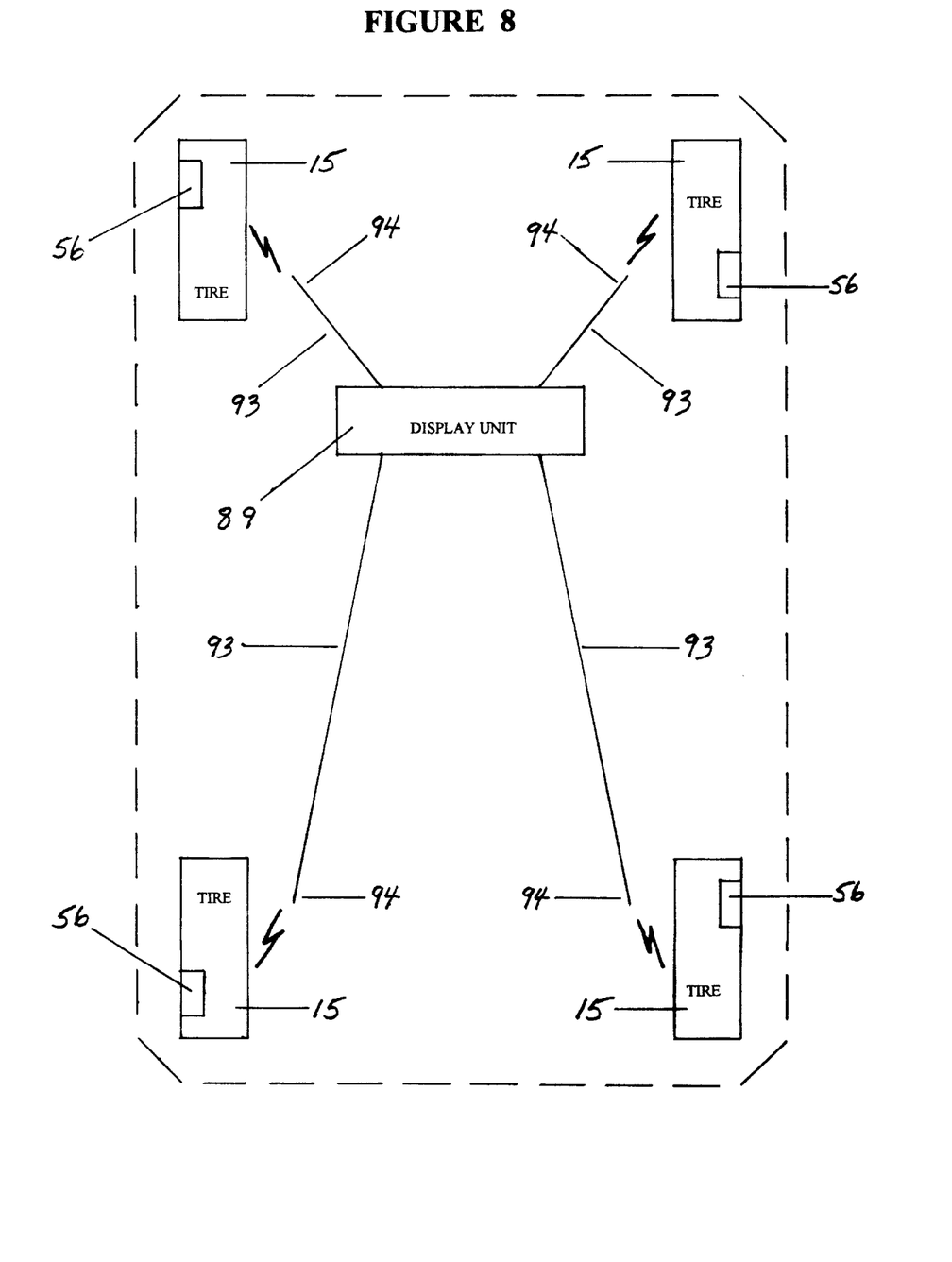
FIG. 8 is a layout of the present invention within a vehicle.

The electrical circuit within the vehicle is more fully shown in FIG. 8. Four wire leads 93 extend from the display unit 89 to a convenient location adjacent to each tubeless tire 15. Each of the wire leads 93 terminate with a receiving antennas 94. Each of the receiving antennas 94 pick up an under-inflation signal from the pressure detector/transducer 56 on the tubeless tire 15 adjacent to it, and does not pick up a signal from any of the three other pressure detector/transducer 56. Thus, by this identification of the receiving antennas 94 the display unit 89 knows which tire is under-inflated, and displays this information to the driver. When the tires are rotated, and if one tire has a slow leak, via the location of the receiving antennas 94, the display unit 89 will continue to display the correct location of the tire with the slow leak. If more than one tire has a leak, the display unit 89 will display the location of all tires with a leak.

Figure 9:
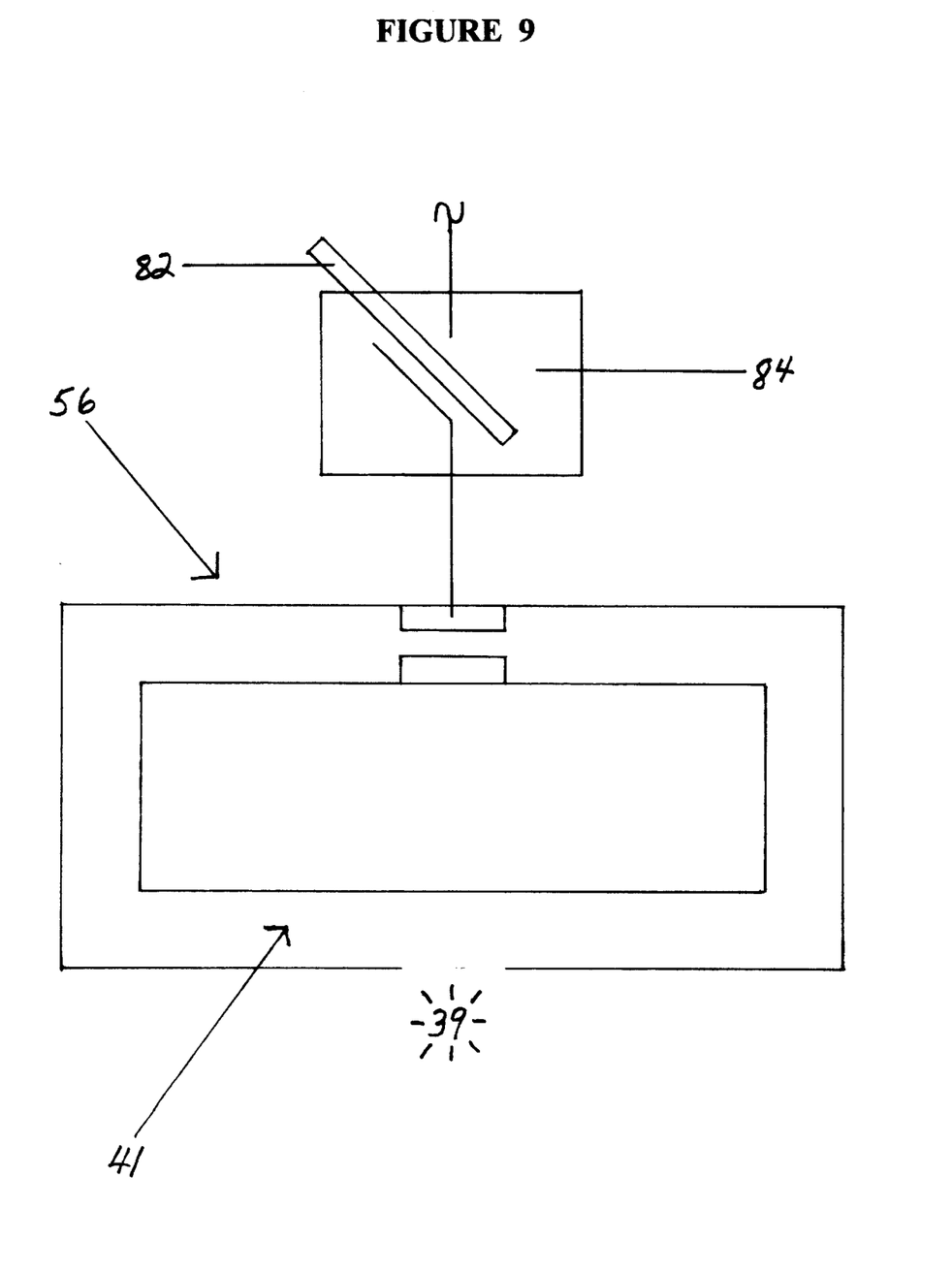
FIG. 9 is an alternative embodiment of the invention.
Figure 10:
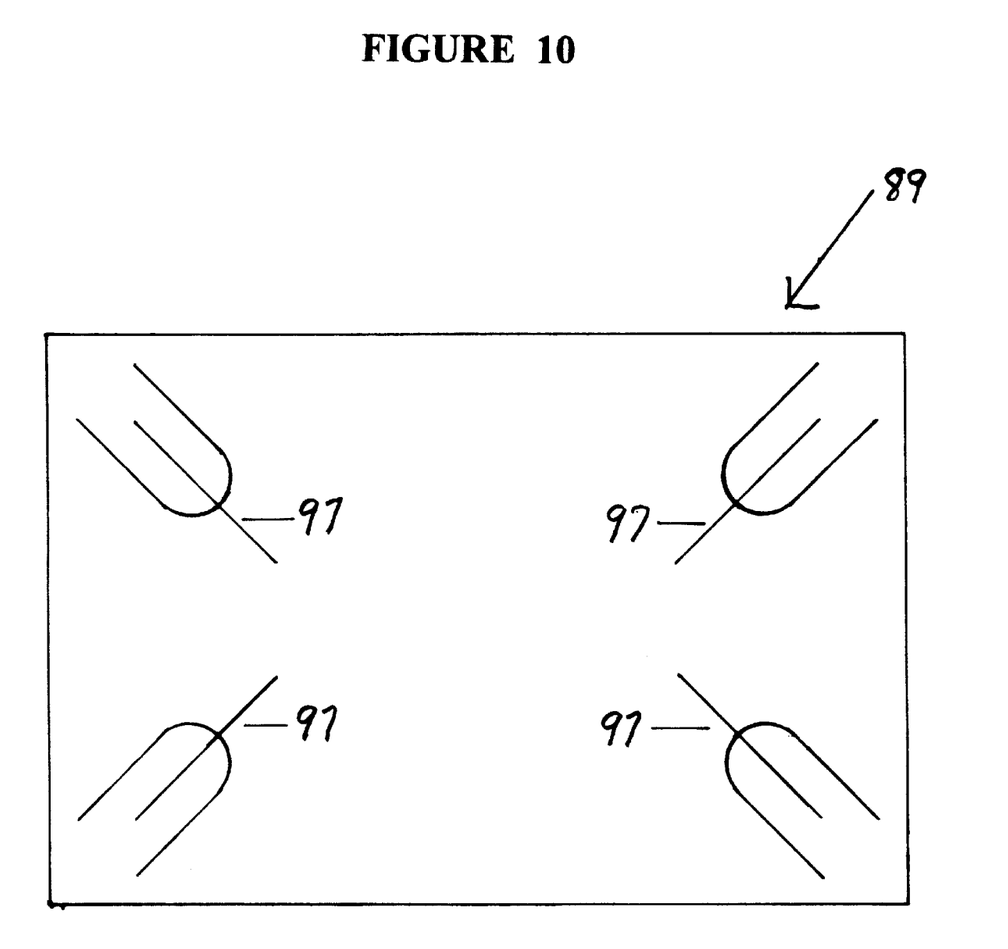
FIG. 10 is another alternative embodiment of the invention.

FIGS. 9 and 10 disclose some of the alternative embodiment of the invention. The pressure detector/transducer 56 may have a pre-sealed reference chamber 41. The pre-sealed reference chamber 41 of the particular pressure detector/transducer 56 would be at the design pressure or a few p.s.i. below. Thus for each of the numerous different tire models, there would have to be a corresponding pressure detector/transducer 56.

There are three advantages of a pre-sealed reference chamber 41 over a post-sealed reference chamber 41. First, a pre-sealed reference chamber 41 has no need for a secondary air passage bore 37 and therefore no need for an inner valve core 43, shown in FIGS. 3, 4, and 5. This design is therefore less costly.

Second, this design would prevent the intentional under-inflation of tires to increase the smoothness of the ride. This practice has the adverse effect on the driver of substantially decreasing the tire life. It also has the adverse effects on both the driver and the public of decreasing the stability, particularly at high speeds, and of decreasing the mileage of the vehicle. Decreased mileage may be translated, on a national scale of increased reliance on imported oil.

Third, the pre-sealed version is a virtually essential component of any future governmental or industry regulation in this area, since a pre-sealed reference chamber 41 at, e.g. 30 p.s.i. would ensure that the driver would be alerted to any pressure under 30 p.s.i. over the tire's normal life. A pre-sealed reference chamber 41 with an external pressure switch 54, see FIG. 6, would have the switch closed during its shelf life. A pre-sealed reference chamber 41 could be substituted for the post-sealed reference chamber 41 described in the foregoing example, provided that the circuit had a physical block 82 holding a spring biased protective switch 84 open to form an electrical block during the shelf life of the pressure detector/transducer 56. At installation, the physical block 82 is removed, and the external pressure switch 54 of the pre-sealed reference chamber 41 is closed.

Alternatively a inertial switch 81 would protect the long-life battery 90 both during shelf life and while the vehicle is parked.

The display unit 89 of the foregoing example has been described as a stand alone unit. An alternative, with substantial cost savings, would be to have the display unit 89 be a component of the now conventional keyless alarm and entry systems. Substantial portions of the electronics of a keyless alarm and entry system could also be used in the car mounted portions of the present invention.

As shown if FIG. 10, an alternative to the four wire leads 93 and receiving antennas 94, the display unit 89 could be equipped with four directional antennas 97, each aimed to receive a signal from one of the four vehicle tires. The display unit 89 thus could receive the signals from the four tires, and know which tire wa sending a signal, by which of the directional antennas 97 received the signal.

The microprocessor 86 could also be designed to detect a low voltage condition of the long-life battery 90 or to transit a different signal to the display unit 89 depending on the degree of under-inflation. Minor under-inflation requires nothing other than attention when the next filling station is reached. Severe under-inflation requires an immediate visual inspection, and either proceeding at reduced speed or waiting to re-inflate the tire.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

It is also to be understood that the following claims are intended to cover all of the generic and specific features of the invention herein described, and all statements of the scope of the invention which, as a matter of language, might be said to fall therebetween.

What is claimed is:

1. In a pressure detector system for a tires on vehicle, each tire having a tire valve, the combination comprising:
   a) a pressure detector/transducer, within each tire, for sending a signal reflecting a under-inflation condition in the tire;
   b) receiving antennas, on the frame of the vehicle, placed adjacent to each tire, to receive the signal from the tire to which it is adjacent;
   c) a visual display of the tire which has an under-inflation condition, on the dashboard of the vehicle;
   d) each tire valve having a pedestal, a stem, and a central bore and an outer valve core and an inner valve core;
   e) each pedestal being an enlarged pedestal, each having a pressure detector/transducer being mounted within the enlarged pedestal;
   f) the central bore leading to a main air passage bore which communicates with the air chamber formed by the tire and the threaded metal sheath, and also communicating with a secondary air passage bore, which communicates with a post-sealed reference chamber;

g) both the outer valve core and the inner valve core having a apertured bridge at the top and a rim at the bottom, and further having a sealing valve stem extending the length of the valve core, each sealing valve stem terminating in a valve seat, each sealing valve stem further being biased upwardly away from the air chamber of the tire;

h) the sealing valve stem of the outer valve core being depressed by the hose of an air pump, and when so depressed, allowing air from the pump to enter the air chamber of the tire;

i) the sealing valve stem, when depressed, also depressing the sealing valve stem of the inner valve core, and the sealing valve stem of the inner valve core, when depressed, allowing air to enter the reference chamber from the air pump;

j) the sealing valve stem of the outer valve core, when not depressed but biased upwardly sealing the air inside the air chamber of the tire, and the sealing valve stem of the inner valve core, when not depressed but biased upwardly sealing the air inside the reference chamber;

k) the reference chamber having a deformable wall which moves outwardly when the air pressure within the air chamber formed by the tire and the metal wheel falls below the air pressure in the post-sealed reference chamber;

l) the deformable wall of the reference chamber having an electrical contact mounted on the exterior side, and in the center of the deformable wall;

m) a rigid wall of the enlarged pedestal spaced apart from the deformable wall, having an electrical contact facing the electrical contact on the deformable wall;

n) when the air pressure in the air chamber of the tire falls below the air pressure in the reference chamber, the electrical contact on the deformable wall touching the electrical contact on the rigid wall, thereby closing a switch in the electrical circuit of the pressure detector/transducer;

o) the electrical circuit powered by a long-life battery;

p) an inertial switch which is normally biased open and closes under centrifugal force when the inertial switch is rotated by the rotation of the tire;

q) a microprocessor in the electrical circuit which is activated when the inertial switch and the switch of the pressure detector/transducer are both closed;

r) the microprocessor, when activated, sending a brief signal to the transmitter, and then going into a sleep mode for a selected time when no further signal goes to the transmitter;

s) the microprocessor, after the selected time has expired, and if both the inertial switch and the switch of the pressure detector/transducer are still closed, again sending a brief signal to the transmitter, and then going into a sleep mode for a selected time when no further signal goes to the transmitter; and, t) the display unit on the dashboard of the vehicle having four wire leads, one going to a position on the body of the vehicle adjacent each tire, each wire lead terminating in one of said receiving antennas, each receiving antennas picking up only a signal generated by the pressure detector/transducer adjacent it, and sending the signal to the display unit;

WHEREBY, the pressure detector/transducer of each tire isolates its long-life battery before installation of the tire valve containing the pressure detector/transducer, further isolates the long-life battery during the time the vehicle is parked, and lastly isolates the long-life battery during the period that adequate pressure is maintained in the air chamber of the tire, and the pressure detector/transducer transmits an under-inflation signal, which is picked up by a receiving antennas associated with that tire, and the signal is sent to the dashboard display unit, which displays the tire which is under-inflated.

2. The combination of claim 1 further including a pre-sealed reference chamber replacing the post-sealed reference chamber.

3. The combination of claim 1 further including four directional antennas within the display unit replacing the four wire leads and the receiving antennas.

4. The combination of claim 1 further including the microprocessor detecting a low voltage condition in the long-life battery and causing the transmitter to send the low voltage signal to the display unit.

5. The combination of claim 1 further including the microprocessor detecting a small low pressure condition and a severe low pressure condition and causing the transmitter to send the either the small low pressure signal or the severe low pressure signal to the display unit.

\* \* \* \* \*